Feb. 1, 1966  D. O. NOORLANDER  3,232,273
FLOW INDICATING LID CONSTRUCTION FOR BUCKET MILKING APPARATUS
Filed Jan. 10, 1964
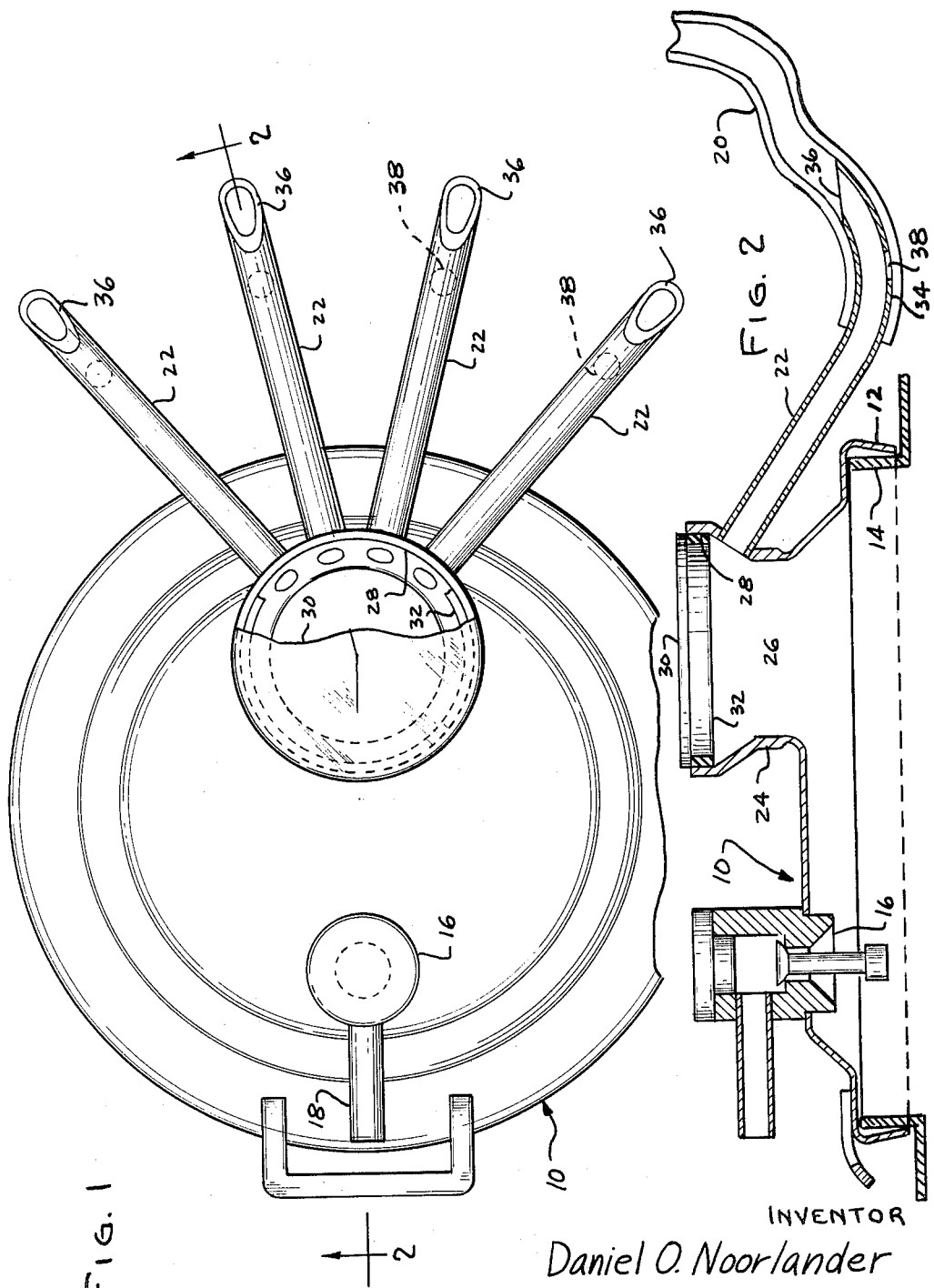
INVENTOR
Daniel O. Noorlander
BY John W. Michael
ATTORNEY United States Patent Office 3,232,273
Patented Feb. 1, 1966

3,232,273
FLOW INDICATING LID CONSTRUCTION FOR
BUCKET MILKING APPARATUS
Daniel O. Noorlander, Madison, Wis., assignor to Dairy
Equipment Company, Madison, Wis., a corporation of
Wisconsin
Filed Jan. 10, 1964, Ser. No. 337,057
3 Claims. (Cl. 119—14.16)

This invention relates to an improved lid construction for a suspended bucket milking apparatus.

From a health standpoint, one of the prime considerations in milking a cow with mechanical means is to avoid over-milking, i.e. continued operation of the milking equipment after the cow's supply of milk is exhausted. Another factor affecting health is the maintenance of a free flow of milk from the inflations during milking. If for any reason the inflation tubes become pinched off during milking, milk may be forced back up into the cow's udder causing infection and other complications. This problem of pinched or bent inflations is particularly acute when milking a low uddered cow with a suspended bucket milker.

One object of this invention is to provide a lid for a bucket milker which has a flow indicator means to permit the operator to readily determine when the flow of milk from any one of the inflations ceases.

Another object is to provide a lid which can be effectively used on cows with particularly low udders without pinching off the inflation tube as was often the case with prior designs.

Other objects and advantages will be pointed out in, or be apparent from, the specification and claims, as will obvious modifications of the single embodiment shown in the drawings, in which:

FIG. 1 is a plan view (with parts broken away) of a lid for a suspended bucket milker made in accordance with the present invention; and FIG. 2 is a sectional view taken along line 2—2 of FIG. 1.

Referring now to the drawings in detail, the lid proper is designated by the numeral 10 which, as in conventional lids, is provided with a depending rim 12 for removable mounting thereof on a milk bucket 14 (shown partially). Also, as in conventional lid constructions, a check valve assembly 16 having a connector nipple 18 is provided to connect the bucket to a source of vacuum for operation of the milking inflations. The outlet portion of one inflation is shown in FIG. 2 and is identified by reference numeral 20.

In use bucket 14 is suspended beneath the cow forwardly and generally somewhat below the cow's udder with the milking inflations connected to the bucket by means of four specially designed milk tubes 22, as shown in FIG. 2. Tubes 22 are mounted on and extend from a circular viewing bushing 24 mounted on the top of the lid as shown which serves to define a viewing chamber 26. Bushing 24 is provided with a viewing opening 28 and has a transparent cover 30 of Plexiglas or other suitable material removably mounted therein by means of a resilient gasket 32 to which cover 30 is attached. As shown in FIG. 2, each tube 22 angles downwardly from chamber 26 to a point at or slightly below the level of rim 12. The tubes then curve slightly upwardly as at 34 in a smooth curve of relatively large radius and terminate at a substantially horizontally disposed opening 36.

The configuration and relative position of tubes 22 are important for several reasons. As indicated previously, the lid of this invention is particularly well adapted for use in milking so-called "low uddered" cows, i.e. cows with udders near to the ground. It will be appreciated that when milking such a "low uddered" cow the inflations will of necessity be positioned at a particularly low level which presents a problem in establishing connection to the lid of the milking bucket. This problem is very effectively solved by the use of milk tubes 22 like those shown in the drawings and described above which extend downwardly from the lid and then curve smoothly upward for connection to the inflations. With this arrangement the inflations are not as likely to be pinched off due to an abrupt bend therein which was often the case in prior designs. As shown in FIG. 2, even if the inflation 20 must bend slightly from the upward curve of tube 22 the open end 36 of the tube still remains open to the inside of the inflation to permit free flow of milk from the inflation into the tube. Furthermore, due to the relatively low level of opening 36 at the end of tube 22 cows with low udders can be better handled than with prior designs where the tubes terminated at a higher level.

It is noted that each tube 22 is provided with an inspection opening 38 located in the bottom portion of the lower section of the tube. The purpose of such inspection opening is to permit visual inspection of the entire length of the tube and thus comply with sanitation requirements.

It will be appreciated that as milk flows from the inflation 20 and then up through tubes 22 during milking such flow will impinge on transparent cover 30 mounted on viewing bushing 24 and will thus be readily visible to the operator. Thus it becomes a simple matter to monitor each cow during milking so that upon termination of flow from any one of the inflations such inflation can be immediately disconnected from the cow's teat and thus avoid damage to the cow as would otherwise result. It should be noted that the flow indicating means described above is effective to indicate flow from each individual inflation and thus permits selective disconnection thereof when necessary while allowing the others to remain in operation as long as milk continues to flow therefrom.

While the lid construction of this invention is particularly well adapted for use on a bucket milker which is suspended from the cow, it should be understood that it could also be used to advantage on other types of milking apparatus such as with a bucket milker wherein the bucket is placed on the ground. It should also be noted that while the term "transparent" has been used to define cover 30 such term is intended to cover any material which allows viewing therethrough.

Although but one embodiment of the present invention has been illustrated and described, it will be apparent to those skilled in the art that various changes and modifications may be made therein without departing from the spirit of the invention or from the scope of the appended claims.

I claim:
1. A lid for a milk receiving bucket comprising:
    a body portion having a rim for removable mounting thereof on a milk receiving bucket;
    a viewing bushing mounted on said body portion and having an upwardly disposed viewing opening therein;
    a transparent cover member for said viewing opening; and
    a plurality of external milk tubes connected to said viewing bushing adjacent said viewing opening and communicating with the interior of said viewing bushing, said milk tubes angling downwardly and away from the point at which they are connected to said viewing bushing so that milk flowing through said tube into said bushing will impinge on said transparent cover member and thus be readily visible from outside the lid, said tubes being curved upwardly at the open ends thereof for connection to the outlet of a milking inflation.

2. A lid according to claim 1 in which said milk tubes angle downwardly to at least the level of said lid before they curve upwardly.

3. A lid according to claim 1 in which each of said milk tubes has an inspection opening located in the lowermost portion thereof.

References Cited by the Examiner

UNITED STATES PATENTS

| | | | |
|---|---|---|---|
| 1,919,172 | 7/1933 | Schmitt | 119—14.16 |
| 2,376,717 | 5/1945 | Omdalen | 119—14.16 X |
| 2,466,841 | 4/1949 | Eades | 119—14.16 X |
| 2,513,627 | 7/1950 | Dinesen | 119—14.16 |
| 3,150,637 | 9/1964 | Fosnes | 119—14.54 |

SAMUEL KOREN, *Primary Examiner.*

ALDRICH F. MEDBERY, *Examiner.*